United States Patent Office 3,317,327
Patented May 2, 1967

3,317,327
METHOD OF RETARDING THE SETTING TIME OF CEMENT
Osaku Matsuda and Norihiro Kudo, Tokyo, Japan, assignors to Onoda Cement Company, Limited, Yamaguchi Prefecture, Japan
No Drawing. Filed Jan. 6, 1964, Ser. No. 336,072
3 Claims. (Cl. 106—90)

This invention relates to a method of retarding the setting time of cement selected from Portland cement and a cement mixture comprising Portland cement by adding a retarding agent consisting of at least one silicofluoric compound and at least one organic surface active agent, together with and without an additional component selected from inorganic acids and organic acids.

An object of this invention is to provide a method of retarding the setting time of Portland cement in order to give an easily controllable softness and a workability to Portland cement paste, mortar and concrete especially at elevated temperatures in summertime as well as to give an improved development of strength to them.

Another object of this invention is to provide a method of retarding the setting time of Portland type cement comprising blast furnace slag, siliceous material or pozzolanic material in order to give an easily controllable softness and a workability to Portland type cement paste, mortar and concrete especially at elevated temperatures in summertime as well as to give an improved mechanical strength to them.

It is well known that starch, cellulose, sugar, phosphoric acid, organic acids, salts of organic acids and silicofluorides have the retarding effect on the setting time of cement. However, such retarding agents are not practically usable, because when such agents are used as the retarding agents the slightest variation in their amounts, the mixing procedure or the mixing temperature seriously retards the setting time of cement or impedes the development of the strength or causes the cement to set undesirably too fat—in any way because the action of such agents for the cement is too unstable and therefore they are precarious in practical use.

In order to achieve the foregoing objects and overcome the defects adherent to the prior retarding agents, the inventors have long investigated and have found a new and effective retarding agent for cement.

This invention relates to a method of retarding the setting time of cement selected from Portland cement and a cement mixture comprising Portland cement by adding a new and effective retarding agent consisting of at least one silicofluoric compound as the first component and at least one organic surface active agent as the second component together with and without an additional member selected from inorganic acids and organic acids as the third component.

In accordance with this invention, silicofluoric compounds used as the first component includes water insoluble or water slightly soluble silicofluoric compounds such as sodium silicofluoride ($Na_2SiF_6$), potassium silicofluoride ($K_2SiF_6$), barium silicofluoride, ($BaSiF_6$), and calcium silicofluoride ($CaSiF_6$) or water soluble silicofluoric compound such as silicofluoric acid ($H_2SiF_6$), magnesium silicofluoride ($MgSiF_6$), zinc silicofluoride ($ZnSiF_6$), lead silicofluoride ($PbSiF_6$), aluminum silicofluoride [$Al_2(SiF_6)_3$], copper silicofluoride ($CuSiF_6$) and ammonium silicofluoride [$(NH_4)_2SiF_6$] or a mixture of the water insoluble, slightly soluble and soluble silicofluoric compounds.

In accordance with this invention, the organic surface active agent used as the second component has a lipophilic radical and a hydrophilic radical in its molecule and it includes anionic surface active agents and non-ionic surface active agents. The typical examples of the anionic surface active agent are calcium, sodium, potassium or ammonium salt of lignin sulfonic acid, sodium, ammonium or amine salt of sulfuric ester of higher fatty alcohol having carbon atoms of 8 to 18, sodium or potassium salt of alkyl aryl sulfonic acid having carbon atoms of 8 to 18 in the alkyl, and sodium or potassium salt of condensation product of naphthalene sulfonic acid and formaldehyde. The typical examples of the non-ionic surface active agent are addition compounds of ethylene oxide and alkyl ether, alkyl phenol ether, alkyl ester, alkylamine, alkylamide or sorbitan alkyl ester having carbon atoms of 8 to 18 in the alkyl.

It should be noted that such surface active agents may contain a builder such as sodium sulfate, sodium carbonate or carboxy methyl cellulose.

In accordance with this invention, the inorganic acids and the organic acids used as the third component includes, for example, orthophosphoric acid, boric acid, acetic acid and succinic acid and a mixture thereof.

The retarding agent comprising, the silicofluoride and the organic surface active agent or the silicofluoride, the organic surface active agent and at least one acid selected from the inorganic acids and organic acids has a remarkably distinguished effect for retarding the setting time of cement, developing the strength of cement and obtaining highly stable and homogeneous cement paste, cement mortar and concrete.

The retarding agent in accordance with this invention has a surprisingly distinguished effect for retarding the setting time of cement as compared with the case of using the silicofluoride alone and also has an excellent effect for developing the strength of cement, for obtaining a highly homogeneous cement paste, cement mortar and concrete, thereby giving a greater workability to them and decreases an amount of mixing water to cement as compared with the case of using the silicofluoric compound alone. In addition, the amount of the silicofluoric compound can be reduced when it is used together with the organic surface active agent.

In order to explain the mutual actions and effects resulted from the use of silicofluoric compound and an organic surface active agent in combination, the setting tests for Portland cement containing the silicofluoric compound or the surface active agent or both of them were conducted in the method defined under the Japanese Industrial Standards, JIS R 5201 (1959) and the datum resulted from the tests are shown in Tables 1 to 3. Tables 1 and 2 show the results of the comparative examples and Table 3 shows the results of example of this invention. in tables the percentages given are by weight and the figures in the parentheses represent the index numbers of the cement containing a silicofluoride or a surface active agent or both of them against the index number of the cement without them which are calculated as 100.

As obvious from Table 2, only lignin sulfonate displays its retarding effect but other surface active agents do not display their retarding effects.

TABLE 3.—COMPARISON OF THE SETTING TIME OF PORTLAND CEMENT CONTAINING SILICOFLUORIC COMPOUNDS AND ORGANIC SURFACE ACTIVE AGENTS WITH PORTLAND CEMENT NOT CONTAINING EITHER OR BOTH OF THEM

| Test Nos. | Kinds of Silicofluoric Compounds | Ratio of Silicofluoric Compound to Cement (Percent) | Kinds of Surface Active Agent | Ratio of Surface Active Agent to Cement (Percent) | Setting Time | |
|---|---|---|---|---|---|---|
| | | | | | Initial Setting (Hour-Minute) | Final Setting (Hour-Minute) |
| 1 | | | | | 2-21(100) | 3-35(100) |
| 2 | $MgSiF_6$ | 0.10 | | | 4-00(171) | 5-34(155) |
| 3 | $Na_2SiF_6$ | 0.10 | | | 3-32(150) | 5-07(143) |
| 4 | $MgSiF_6$ | 0.10 | $A_1$ | 0.003 | 4-36(196) | 5-55(165) |
| 5 | $MgSiF_6$ | 0.10 | $A_1$ | 0.006 | 4-52(207) | 6-03(169) |
| 6 | $Na_2SiF_6$ | 0.10 | $A_1$ | 0.003 | 4-02(172) | 5-24(151) |
| 7 | $Na_2SiF_6$ | 0.10 | $A_1$ | 0.006 | 4-38(197) | 5-55(165) |
| 8 | $MgSiF_6$ | 0.10 | $A_2$ | 0.10 | 5-31(235) | 6-50(191) |
| 9 | $MgSiF_6$ | 0.10 | $A_2$ | 0.20 | 6-51(292) | 8-32(238) |
| 10 | $Na_2SiF_6$ | 0.10 | $A_2$ | 0.10 | 4-35(195) | 6-03(169) |
| 11 | $Na_2SiF_6$ | 0.10 | $A_2$ | 0.20 | 5-22(228) | 6-59(195) |
| 12 | $MgSiF_6$ | 0.10 | $A_3$ | 0.10 | 4-49(205) | 5-59(167) |
| 13 | $MgSiF_6$ | 0.10 | $A_3$ | 0.20 | 5-10(220) | 6-32(182) |
| 14 | $Na_2SiF_6$ | 0.10 | $A_3$ | 0.10 | 4-15(181) | 5-31(154) |
| 15 | $Na_2SiF_6$ | 0.10 | $A_3$ | 0.20 | 4-48(204) | 6-10(172) |

NOTE.—$A_1$ is ammonium salt of sulfuric acid ester of higher fatty alcohol made of palm oil. $A_2$ is calcium salt of lignin sulfonic acid. $A_3$ is polyoxyethylene nonyl phenol ether.

TABLE 1.—VARIATION OF THE SETTING TIME OF PORTLAND CEMENT CONTAINING SILICOFLUORIC COMPOUND ALONE

| Test Nos. | Ratio of Silicofluoric Compound to Cement | | Setting Time | |
|---|---|---|---|---|
| | Kinds of Silicofluoric Compound | Percent | Initial Setting (Hour-Minute) | Final Setting (Hour-Minute) |
| 1 | | 0 | 2-21(100) | 3-35(100) |
| 2 | $Na_2SiF_6$ | 0.025 | 2-55(124) | 4-14(118) |
| 3 | $Na_2SiF_6$ | 0.05 | 3-29(147) | 40-40(130) |
| 4 | $Na_2SiF_6$ | 0.10 | 3-32(150) | 5-07(143) |
| 5 | $Na_2SiF_6$ | 0.20 | 4-13(180) | 5-49(162) |
| 6 | $Na_2SiF_6$ | 0.50 | 4-56(209) | 6-26(179) |
| 7 | $Na_2SiF_6$ | 1.00 | 2-51(121) | 4-42(131) |
| 8 | $MgSiF_6$ | 0.025 | 3-24(145) | 4-32(131) |
| 9 | $MgSiF_6$ | 0.05 | 3-59(169) | 5-29(153) |
| 10 | $MgSiF_6$ | 0.10 | 4-15(181) | 6-04(169) |
| 11 | $MgSiF_6$ | 0.20 | 4-59(212) | 7-09(200) |
| 12 | $MgSiF_6$ | 0.50 | 6-43(286) | 9-00(251) |
| 13 | $MgSiF_6$ | 1.00 | 8-24(357) | <15-00(<400) |
| 14 | $MgSiF_6$ | 2.00 | >9-00(>400) | <15-00(<400) |

As obvious from Table 1, the retarding effect of sodium silicofluoride ($Na_2SiF_6$) which is water hard soluble is rapidly decreased when its amount reaches above about 0.5% but the retarding effect of magnesium silicofluoride ($MgSiF_6$) which is water soluble is increased as its amount is increased.

TABLE 2.—VARIATION OF THE SETTING TIME OF PORTLAND CEMENT CONTAINING ORGANIC SURFACE ACTIVE AGENTS ALONE

| Test Nos. | Ratio of Organic Surface Active Agents to Cement | | Setting Time | |
|---|---|---|---|---|
| | Kinds of Agents | Percent | Initial Setting (Hour-Minute) | Final Setting (Hour-Minute) |
| 1 | | | 2-21(100) | 3-35(100) |
| 2 | $A_1$ | 0.003 | 2-20(99) | 3-36(100) |
| 3 | $A_1$ | 0.006 | 2-17(97) | 3-35(100) |
| 4 | $A_2$ | 0.10 | 2-45(117) | 3-46(105) |
| 5 | $A_2$ | 0.20 | 3-03(130) | 3-54(109) |
| 6 | $A_3$ | 0.10 | 2-15(96) | 3-18(92) |
| 7 | $A_3$ | 0.20 | 2-23(101) | 3-36(100) |

NOTE.—$A_1$ is ammonium salt of sulfonic acid ester of higher fatty alcohol made of palm oil. $A_2$ is calcium salt of lignin sulfonic acid. $A_3$ is polyoxyethylene-nonyl phenol ether.

Table 3 clearly shows the mutal effects resulted from the use of the silicofluorides and the organic surface active agents in combination. As seen, for example, from test No. 8 the combination of 0.1% of magnesium silicofluoride and 0.1% of calcium salt of lignin sulfonic acid shows a more higher retarding effect than the case of using a 0.2% lignin sulfonic acid alone as shown in test No. 5 of Table 2 or using a 0.2% of magnesium silicofluoride alone as shown in test No. 11 of Table 1.

In accordance with this invention, the water insoluble or water slightly soluble silicofluoric compounds are usually added to cement in an amount of from 0.01% to 0.5% because said silicofluoric compounds decrease their retarding effect when they are used in an amount of above 0.5% as single component respectively. And also, the water soluble silicofluoric compounds are usually added to cement in an amount of from 0.01% to 1%. However, it should be understood that such amounts of the silicofluorides are not critically defined ones as their effects are variable depending on the composition of cement paste, cement mortar and concrete, and also the temperature for working of them.

In accordance with this invention, the ratio of the silicofluoric compound to the organic surface active agent is not critical as the organic surface active agent can be optionally selected and usually used in an amount of 0.001% to 0.5% by weight of cement depending on its dispersing property or air-entraining effect.

Further, in accordance with this invention, the inorganic acids or the organic acids can be usually used in a ratio by weight of said acids to the silicofluorides being below 50%. However, it should be understood that the ratio must be optionally selected because the interval between the initial setting time and the final setting time of cement elongates with the ratio of said acids to said silicofluoric compounds increases.

In order to explain the mutual actions and effects resulted from the use of magnesium silicofluoride, lignin sulfonate and an inorganic acid or an organic acid in combination, the setting tests for Portland cement were conducted in the method defined under the Japanese Industrial Standards, JIS R 5201 (1959) and the datum resulted from the tests are listed in the following Table 4.

TABLE 4.—COMPARISON OF THE SETTING TIME BETWEEN PORTLAND CEMENT CONTAINING A SILICOFLUORIC COMPOUND, A SURFACE ACTIVE AGENT AND AN ACID WITH PORTLAND CEMENT NOT CONTAINING EITHER OR ALL OF THEM

| Test Nos. | Amount of MgSiF$_6$ (percent) | Amount of Lignin-Sulfonate (percent) | Amount of Acid (percent) | Setting Time Initial Setting (Hour-Minute) | Setting Time Final Setting (Hour-Minute) |
|---|---|---|---|---|---|
| 1 | 0 | 0 | 0 | 2-21 (100) | 3-35 (100) |
| 2 | 0.10 | 0 | 0 | 4-00 (171) | 5-34 (155) |
| 3 | 0.10 | 0 | Orthophosphoric acid 0.01 | 4-42 (200) | 6-49 (186) |
| 4 | 0.10 | 0.10 | ___do___ | 6-11 (=263) | 8-15 (230) |
| 5 | 0 | 0.10 | 0 | 2-45 (117) | 3-46 (105) |
| 6 | 0.10 | 0.10 | Boric acid, 0.01 | 3-46 (160) | 7-03 (197) |
| 7 | 0.10 | 0 | Succinic acid, 0.01 | 4-53 (208) | 7-10 (200) |
| 8 | 0.10 | 0.10 | ___do___ | 6-32 (278) | 8-50 (247) |
| 9 | 0.10 | 0.10 | Acetic acid, 0.01 | 4-12 (179) | 6-47 (189) |

As obvious from Table 4, test Nos. 4 and 8 show that the retarding agent in accordance with this invention had the excellent effect.

Further, in order to explain the mutual actions and effects resulted from the use of magnesium silicofluoride and an organic surface active agent in combination, the setting tests for Portland concrete were conducted at 20° C. in the method defined under American Standard for Testing Materials (ASTM) C 403-61T. This test is a test for measuring the Proctor needle penetration resistance of concrete. In this test, the expected slump is 15 cm. and the initial setting time means the time for the penetration resistance reaching 500 p.s.i. and the final setting time means the time for the penetration resistance reaching 4000 p.s.i. The concrete used in this test was prepared by mixing 300 kilograms of Portland cement per cubic meter of concrete, 176 kilograms of water per cubic meter of concrete and sand in an amount of 41% by weight of the total aggregate. The datum resulted from the tests are given in the following Table 5.

TABLE 5.—TEST FOR THE SETTING TIME OF CONCRETE BY MEASURING THE PROCTOR NEEDLE PENETRATION RESISTANCE (P.S.I.)

| Test Nos. | Amounts of MgSiF$_6$ (percent) | Kinds of Surface Active Agent | Amount of Surface Active Agent (percent) | Initial Setting (Hour-Minute) | Final Setting (Hour-Minute) |
|---|---|---|---|---|---|
| 1 | | | | 5-20 (100) | 6-35 (100) |
| 2 | 0.10 | | | 7-25 (139) | 8-40 (132) |
| 3 | 0.20 | | | 9-15 (173) | 10-35 (161) |
| 4 | 0 | Calcium salt of lignin sulfonic acid | 0.10 | 6-20 (119) | 7-10 (109) |
| 5 | 0 | ___do___ | 0.20 | 7-25 (139) | 8-30 (129) |
| 6 | 0.10 | ___do___ | 0.10 | 9-30 (178) | 10-50 (165) |
| 7 | 0.10 | ___do___ | 0.20 | 12-25 (233) | 14-25 (219) |
| 8 | 0.20 | ___do___ | 0.10 | 11-30 (216) | 12-45 (194) |
| 9 | 0.20 | ___do___ | 0.20 | 15-25 (289) | 17-35 (267) |
| 10 | 0 | Polyoxymethylene nonyl phenol ether | 0.10 | 5-10 (97) | 6-20 (96) |
| 11 | 0 | ___do___ | 0.20 | 5-25 (102) | 6-30 (99) |
| 12 | 0.10 | ___do___ | 0.10 | 7-55 (148) | 8-55 (135) |
| 13 | 0.10 | ___do___ | 0.20 | 8-40 (163) | 9-45 (148) |
| 14 | 0.20 | ___do___ | 0.10 | 10-35 (198) | 11-40 (177) |
| 15 | 0.20 | ___do___ | 0.20 | 11-55 (223) | 13-00 (198) |
| 16 | 0 | Naphthalene sulfonateformaline condensation product | 0.10 | 5-05 (95) | 6-00 (91) |
| 17 | 0 | ___do___ | 0.20 | 4-50 (91) | 5-55 (90) |
| 18 | 0.10 | ___do___ | 0.10 | 7-50 (147) | 8-55 (135) |
| 19 | 0.10 | ___do___ | 0.20 | 8-20 (156) | 9-35 (146) |
| 20 | 0.20 | ___do___ | 0.10 | 10-00 (188) | 11-10 (170) |
| 21 | 0.20 | ___do___ | 0.20 | 11-00 (206) | 12-15 (186) |

The following Table 6 shows the compressive strength in kg./cm.$^2$ of the concrete tested by the use of test pieces of 15 cm. dia. and 30 cm. length at 20° C. after placed and cured at 15° C. The concrete used in this test was prepared by mixing 312 kilograms of Portland cement per cubic meter of concrete, 156 kilograms of water per cubic meter of concrete and sand in an amount of 38% by weight of the total aggregate of which the largest diameter is 25 mm., and its slump was 10 cm.

TABLE 6.—THE SETTING TIME AND THE COMPRESSIVE STRENGTH OF THE CONCRETE

| Test Nos. | Amount of MgSiF$_6$ (Percent) | Amount of H$_3$PO$_4$ (Percent) | Amount of Calcium Salt of Lignin Sulfonic Acid (Percent) | Setting Time Initial Setting (Hour-Minute) | Setting Time Final Setting (Hour-Minute) | Compression Strength (kg./cm.$^2$) 3 days | 7 days | 28 days |
|---|---|---|---|---|---|---|---|---|
| 1 | 0.2 | 0.01 | 0.25 | 11-30 | 13-45 | 226 | 250 | 395 |
| 2 | 0.2 | | 0.25 | 9-20 | 10-40 | 177 | 221 | 350 |
| 3 | | | 0.25 | 6-20 | 7-25 | 175 | 217 | 334 |

It is obvious from Table 6 that the retardation of the development of compressive strength of the concrete can be avoided by applying this invention.

What we claim is:

1. A method of retarding the setting time of cement selected from Portland cement, and a cement mixture comprising Portland cement, which comprises adding sodium silicofluoride ($Na_2SiF_6$), in an amount of from about 0.01% to 0.5% by weight of said cement and at least one organic surface-active agent selected from the group consisting of an ammonium salt of the sulfuric acid ester of a higher fatty alcohol, a calcium salt of lignin sulfonic acid, polyoxyethylene-nonyl phenol ether, polyoxymethylene-nonyl phenol ether, and naphthalene sulfonate-formaldehyde condensation product in an amount of from 0.001% to 0.5% by weight of said cement.

2. A method of retarding the setting time of cement selected from Portland cement and a cement mixture comprising Portland cement, which comprises adding magnesium silicofluoride ($MgSiF_6$), in an amount of from about 0.01% to 1.0% by weight of said cement and at least one organic surface-active agent selected from the group consisting of an ammonium salt of the sulfuric acid ester of a higher fatty alcohol, a calcium salt of lignin sulfonic acid, polyoxyethylene-nonyl phenol ether, polyoxymethylene-nonyl phenol ether and naphthalene sulfonate-formaldehyde condensation product in an amount of from 0.001% to 0.5% by weight of said cement.

3. A method of retarding the setting time of cement selected from Portland cement and a cement mixture comprising Portland cement, which comprises adding magnesium silicofluoride ($MgSiF_6$), in an amount of from about 0.01% to 1.0% by weight of said cement, a calcium salt of lignin sulfonic acid in an amount of from 0.001% to 0.5% by weight of said cement, and at least one acid selected from the group consisting of orthophosphoric acid, boric acid, acetic acid and succinic acid in an amount of below 50% by weight of said magnesium silicofluoride.

References Cited by the Examiner

UNITED STATES PATENTS

| | | | |
|---|---|---|---|
| 1,644,964 | 10/1927 | Welch | 106—90 |
| 1,726,403 | 8/1929 | Mathey | 106—315 |
| 2,006,426 | 7/1935 | Weiler | 106—92 |
| 2,113,375 | 4/1938 | Himsworth et al. | 106—315 |
| 2,211,368 | 8/1940 | Dickens | 106—315 |
| 2,575,599 | 11/1951 | Silverman | 106—90 |
| 2,927,033 | 3/1960 | Benedict et al. | 106—90 |
| 3,053,673 | 9/1962 | Walker | 106—90 |

TOBIAS E. LEVOW, *Primary Examiner.*

HELEN M. McCARTHY, *Examiner.*

S. E. MOTT, *Assistant Examiner.*